(12) United States Patent
Chen et al.

(10) Patent No.: US 11,366,270 B2
(45) Date of Patent: Jun. 21, 2022

(54) BROADBAND OPTICAL COUPLING USING DISPERSIVE ELEMENTS

(71) Applicant: Cisco Technology, Inc., San Jose, CA (US)

(72) Inventors: Shiyi Chen, Breinigsville, PA (US); Tao Ling, Breinigsville, PA (US); Weizhuo Li, Berkeley Heights, NJ (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 16/864,104

(22) Filed: Apr. 30, 2020

(65) Prior Publication Data
US 2021/0341672 A1  Nov. 4, 2021

(51) Int. Cl.
*G02B 6/293* (2006.01)
*G02B 6/30* (2006.01)
*G02B 6/122* (2006.01)
*G02B 6/02* (2006.01)
*G02B 6/35* (2006.01)
(Continued)

(52) U.S. Cl.
CPC ..... *G02B 6/29304* (2013.01); *G02B 6/02261* (2013.01); *G02B 6/1225* (2013.01); *G02B 6/30* (2013.01); *G02B 6/3514* (2013.01); *G02B 6/3526* (2013.01); *G02B 6/4214* (2013.01); *G02B 2006/12102* (2013.01); *G02B 2006/12111* (2013.01)

(58) Field of Classification Search
CPC ..... G02B 6/29304; G02B 6/30; G02B 6/4214
See application file for complete search history.

(56) References Cited

U.S. PATENT DOCUMENTS 5,973,838 A * 10/1999 Shirasaki ........... G02B 6/29311
359/577
6,434,291 B1 * 8/2002 Kessler ............. G02B 6/12004
385/16
(Continued)

OTHER PUBLICATIONS

Wang, Y. et al."Compact single-etched sub-wavelength grating couplers for O-band application". Opt. Exp. 25, 30582-30590 (2017).
(Continued)

*Primary Examiner* — Daniel Petkovsek
(74) *Attorney, Agent, or Firm* — Patterson + Sheridan, LLP

(57) ABSTRACT

Embodiments include a fiber to photonic chip coupling system including a collimating lens which collimate a light transmitted from a light source and an optical grating including a plurality of grating sections. The system also includes an optical dispersion element which separates the collimated light from the collimating lens into a plurality of light beams and direct each of the plurality of light beams to a respective section of the plurality of grating sections. Each light beam in the plurality of light beams is diffracted from the optical dispersion element at a different wavelength a light beam of the plurality of light beams is directed to a respective section of the plurality of grating sections at a respective incidence angle based on the wavelength of the light beam of the plurality of light beams to provide optimum grating coupling.

8 Claims, 7 Drawing Sheets

(51) Int. Cl.
   *G02B 6/12*   (2006.01)
   *G02B 6/42*   (2006.01)

(56) References Cited

U.S. PATENT DOCUMENTS

| | | | |
|---|---|---|---|
| 6,477,293 B1* | 11/2002 | Golub | G02B 6/2931 |
| | | | 385/15 |
| 7,330,615 B2 | 2/2008 | McGuire, Jr. | |
| 7,538,945 B2* | 5/2009 | Hikichi | G02B 5/1871 |
| | | | 359/566 |
| 10,146,020 B1* | 12/2018 | Yasumura | G02B 6/12002 |
| 2003/0103725 A1* | 6/2003 | Li | G02B 6/29383 |
| | | | 385/39 |
| 2004/0013431 A1 | 1/2004 | Vail et al. | |
| 2006/0239605 A1* | 10/2006 | Palen | G02B 6/30 |
| | | | 385/14 |
| 2016/0377821 A1* | 12/2016 | Vallance | G02B 6/124 |
| | | | 385/28 |

OTHER PUBLICATIONS

Maire, G. et al."High efficiency silicon nitride surface grating couplers". Opt. Exp. 16, 328-333 (2008).
Araghchini M.,"Design, fabrication and characterization of inverse adiabatic fiber-to-chip couplers,"NSTI-Nanotech 2011 vol. 2 2011.
E.D. Diebold et al., "Giant tunable optical dispersion using chromomodal excitation of a multimode waveguide," Optics Express 19 (24) 2011.
Passoni, et al., "Co-optimizing grating couplers for hybrid integration of InP and SOI photonic platforms", AIP Advances 8, 095109 (2018); https://doi.org/10.1063/1.5046164.

* cited by examiner

BROADBAND OPTICAL COUPLING USING DISPERSIVE ELEMENTS

TECHNICAL FIELD

Embodiments presented in this disclosure generally relate to coupling light from optical fibers with photonic devices. More specifically, embodiments disclosed herein provide for efficient broadband coupling from optical fibers to photonic devices, such as silicon photonic chips, using dispersion elements and optical grating to provide for peak coupling efficiency of the light to the photonic chip.

BACKGROUND

Fiber optics are used to quickly and efficiently transmit information using light. One of the limiting factors in the operation of the fiber optics is the coupling of the light transmitted through the optical fibers to optoelectronic and photonic devices. One method to provide coupling between optical fibers and various devices is to use optical grating, such as silicon grating. However, optical coupling using an optical grating has limited light spectrum bandwidth, which in turn limits the application of optical grating to specific types of optical communication systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
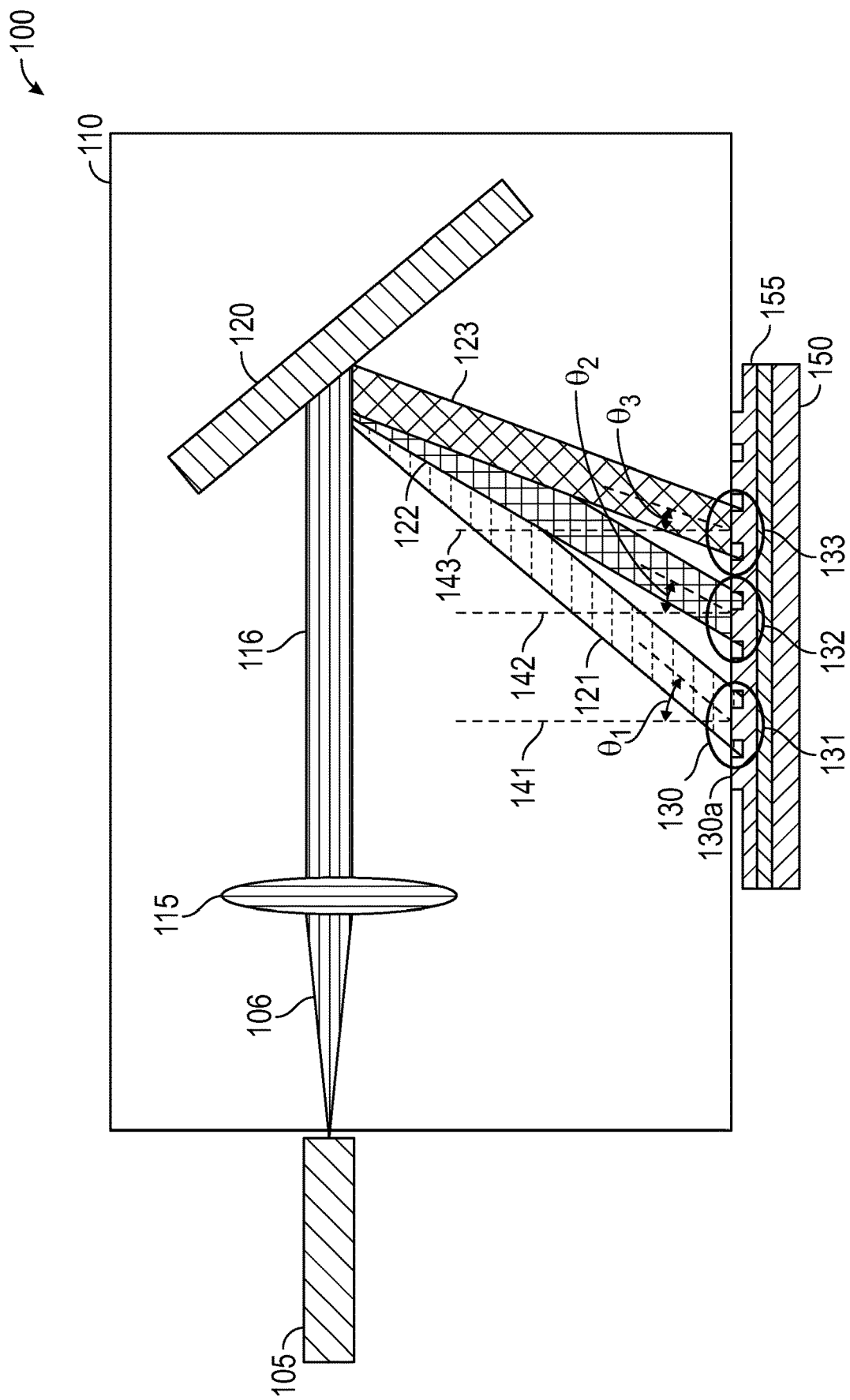
FIG. 1A illustrates a fiber to photonic chip coupling system with a dispersive element, according to one embodiment.

One general aspect includes a fiber to photonic chip coupling system with a dispersive element. The optical coupling system also includes a collimating lens configured to collimate a light transmitted from a light source. The optical coupling system also includes an optical grating which may include a plurality of grating sections and an optical dispersion element configured to separate the collimated light from the collimating lens into a plurality of light beams. The optical dispersion element also directs each of the plurality of light beams to a respective section of the plurality of grating sections at respective optimum incidence angle, where each light beam in the plurality of light beams is diffracted from the optical dispersion element at a different wavelength, and where a light beam of the plurality of light beams is directed to a respective section of the plurality of grating sections at respective optimum incidence angle based on the wavelength of the light beam of the plurality of light beams.

One example embodiment includes an optical dispersion element configured to separate a collimated light into a plurality of light beams and direct each of the plurality of light beams to a respective section of an optical coupling grating at respective optimum incidence angle, where each light beam in the plurality of light beams is diffracted from the optical dispersion element at a different wavelength, and wherein a light beam of the plurality of light beams is directed to a respective section of a plurality of grating sections on an associated optical grating at respective optimum incidence angle based on the wavelength of the light beam of the plurality of light beams.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving a wavelength spectrum for a light from an optical source, determining a wavelength for each of a plurality of light beams of the light separated by an optical dispersion element, determining a plurality of incidence angles for each determined wavelength or wavelength band based on the optical grating coupler, and determining a position of the optical dispersion element in the optical coupling system according to the plurality of incidence angles. Other embodiments of this aspect include corresponding computer systems, apparatus, and computer programs recorded on one or more computer storage devices, each configured to perform the actions of the methods.

Example Embodiments

Fiber optic communication systems are increasingly a ubiquitous part of modern communication and data transmission. As more and more services utilize fiber optic communications, efficiencies in the fiber optic systems need to be maximized in order to streamline production of the fiber optic systems and avoid unnecessary or expensive components in the fiber optic communication systems.

One example limiting factor in the operation of the fiber optic communication systems is the efficient coupling of light from a fiber to a photonic chip without increasing the costs of the coupling components. Several methods exist including various types of optical coupling; however, coupling using optical grating couplers has emerged as a commonly used and low-cost way to couple light from fibers to photonic chips. Grating couplers provide efficiency as they can be placed anywhere on a photonic chip as opposed to other types of couplers which may require a device edge or other structure to provide coupling. Grating couplers also require less precise alignment between a fiber and the photonic chip, thus reducing some active alignment processes required in other edge types.

However, optical grating has limited bandwidth response when compared to other more expensive coupling methods such as edge-coupling. This limited bandwidth is due to the fact that each wavelength has a different spectrum response to the grating. These limitations of the optical grating, in turn, limit the application of the lower cost optical grating couplings to specific types of optical communication systems.

The systems, couplers, and dispersion elements described herein provide a fiber to photonic chip coupling system including an optical dispersion element which directs light beams from a fiber optic light source to a respective grating section of an optical grating connected to a photonic chip with a responsive optimum incidence angle based on the wavelength. The light beams are directed to a grating section with an optimum incidence angle which provides a peak or optimum coupling efficiency for the wavelength of the light beam. This enables the grating to provide an efficient and broadband spectrum response to the optical fiber.

FIG. 1A illustrates a fiber to photonic chip coupling system with a dispersive element, according to one embodiment. The fiber to photonic chip coupling system, system 100, includes an optical source, light source 105 (e.g., a light source such as a fiber optical cable, multiple fiber optic cables, etc.), an optical free space wavelength separator 110, which includes a collimated lens and a dispersive element described below, and a photonic chip 150. The photonic chip 150 is any type of photonic and/or optoelectronic device that may interact with optical/light sources, such as optical fibers. For example, the photonic chip 150 may be a photonic chip among a plurality of photonic chips affixed to a substrate (e.g., a wafer, etc.). The photonic chip 150 includes a waveguide 155, which may include a plurality of various waveguides providing an optical path from a grating coupler, optical grating 130, to the various optical and electronic elements of the photonic chip 150.

In an example where the optical free space wavelength separator 110 is not used in the coupling scheme from the light source 105 to the photonic chip 150 (example not shown), the light source 105 is coupled directly to the optical grating 130. A light from the light source 105 then couples to the waveguides 155 of the photonic chip 150 at a reduced or narrow band spectrum due to power coupling inefficiencies where various wavelengths of the light from the light source 105 have non-optimal incidence angles. The non-optimal incidence angles cause inefficient coupling of the light such that only a limited band of the light from the light source 105 is able to efficiently and reliably couple to the waveguides 155.

Figure 1B:
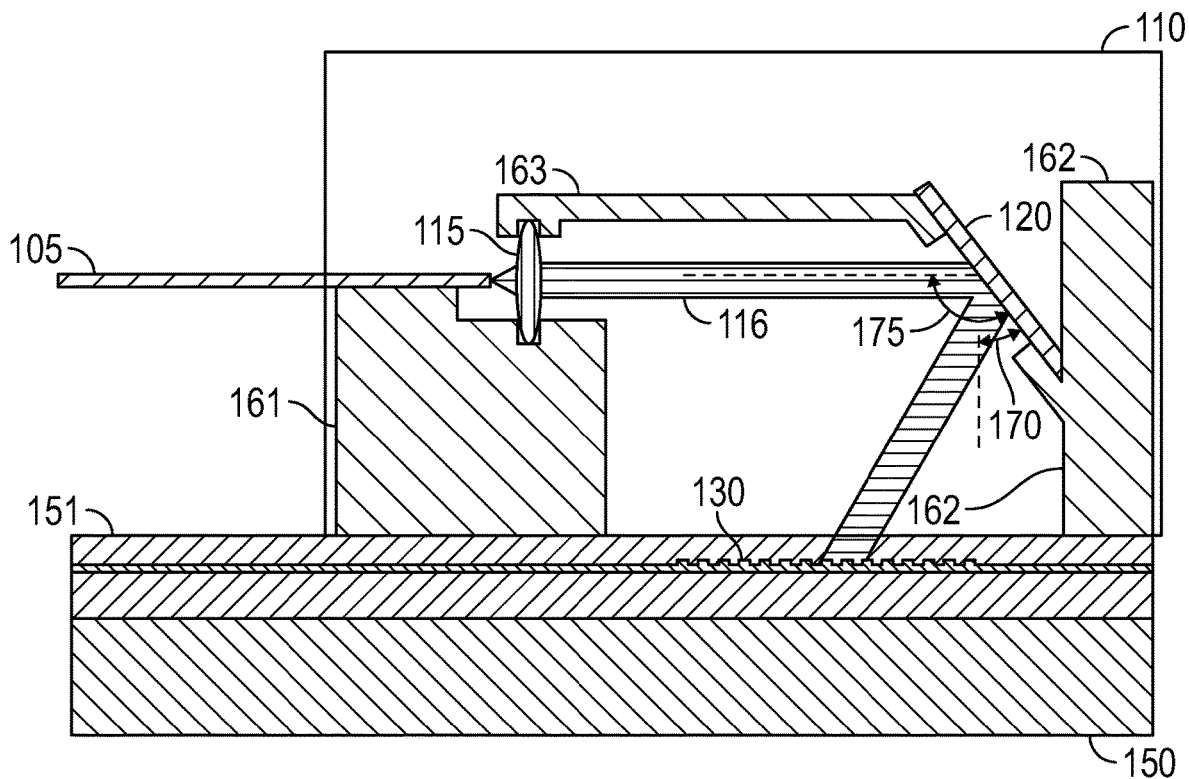
FIG. 1B illustrates a packaging configuration of fiber to photonic chip coupling system with a dispersive element, according to one embodiment.
Figure 1C:
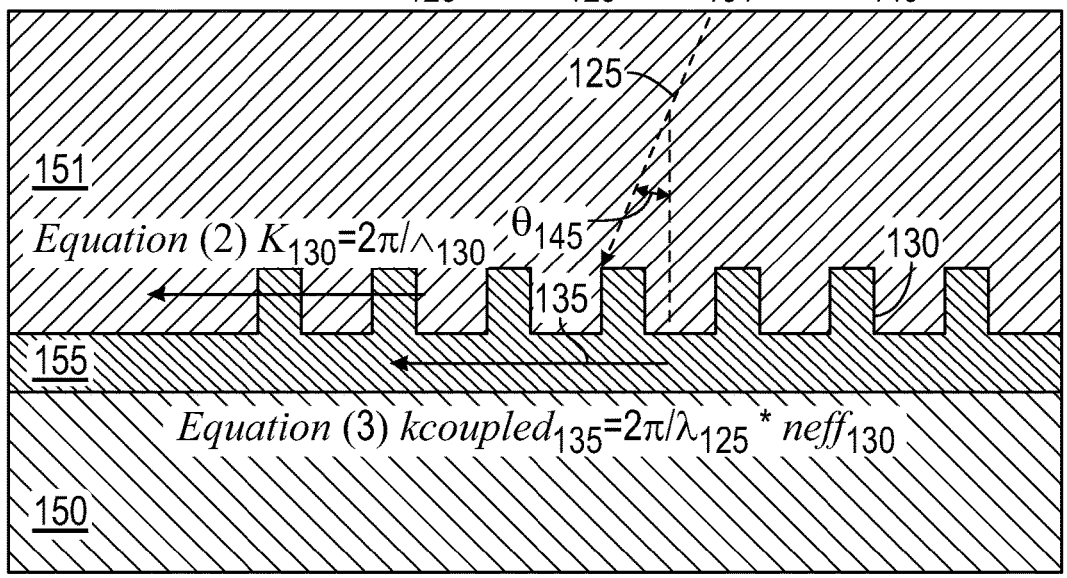
FIG. 1C illustrates light coupling mechanism of photonic grating coupler in a fiber to photonic chip coupling system, according to one embodiment.
Figure 1D:
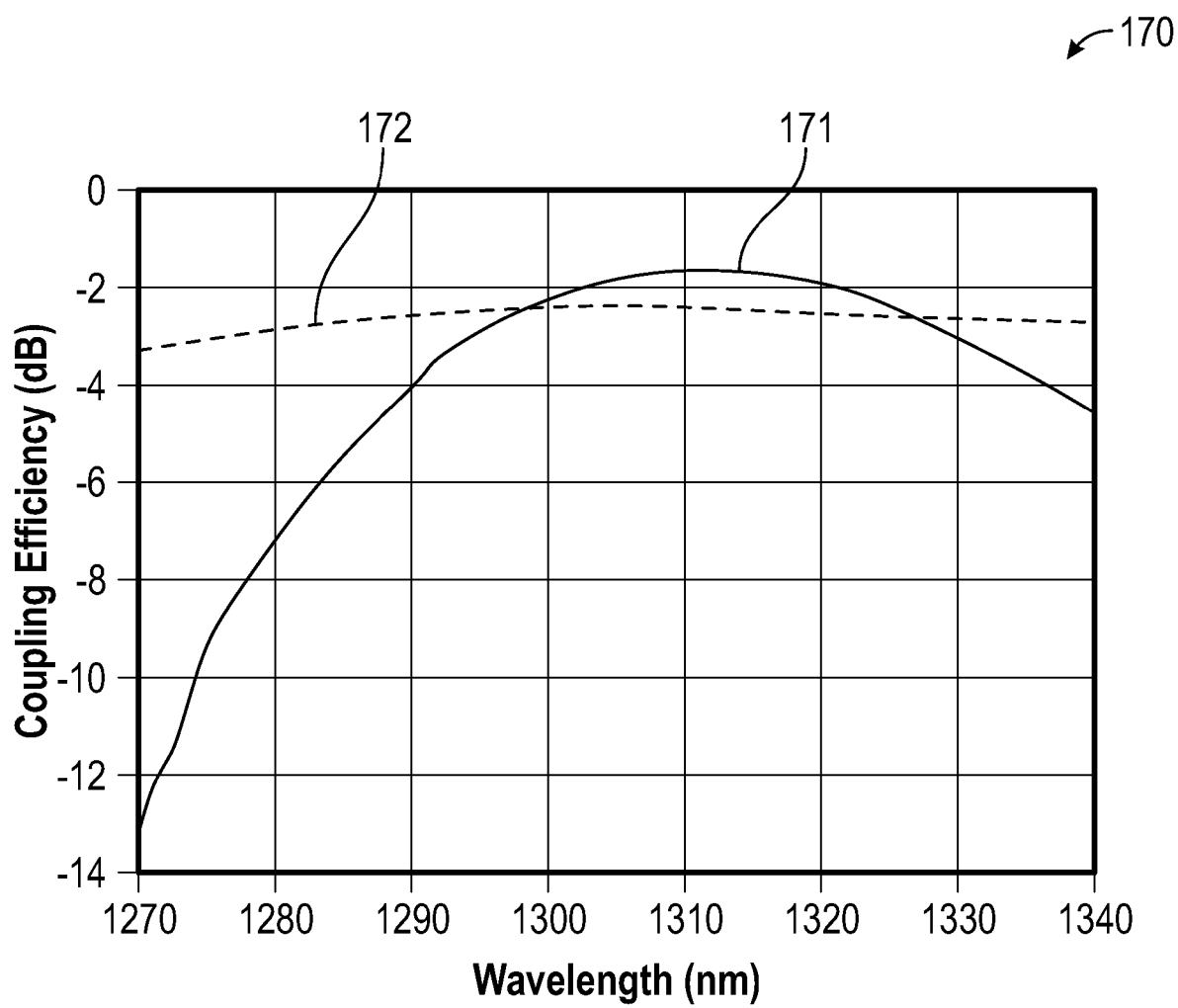
FIG. 1D illustrates example coupling efficiency spectrums for a fiber to photonic chip coupling system without a dispersive element and a fiber to photonic chip coupling system with a dispersive element, according to example embodiments.

One example coupling efficiency is shown in as shown in FIG. 1D, which illustrates coupling efficiency bandwidth for coupled lights. As shown, a plot 171 illustrates an example coupling efficiency for a direct coupling between the light source 105 and the optical grating 130. In this example, the coupling efficiency is greatest for a specific wavelength (e.g., approximately 1310 nm where the grating's 1 dB bandwidth is approximately 35 nanometers (e.g., approximately 1295-1330 nm based on the incidence angle). In contrast, a plot 172 illustrates an example coupling efficiency for a coupling between the light source 105 and the optical grating 130 using a coupling the optical free space wavelength separator as described herein. As shown, the 1 dB bandwidth for the plot 172 is above 100 nm (i.e. almost tripling the coupling spectrum bandwidth of the direct coupling of the plot 171).

Turning back to FIG. 1A, the optical free space wavelength separator 110 includes a collimating lens 115 and a dispersion element 120. The collimating lens 115 receives an un-collimated light 106 from the light source 105 and outputs the collimated light 116 which includes various rays of collimated light. The collimated light 116 is directed to the dispersion element 120. In some examples, the collimating lens 115 is a component of or integrated with the light source 105. For example, the light source 105 is a fiber optic cable with a lens attached to an end or terminus of the fiber as discussed in relation to FIG. 2. The collimating lens 115 may be collocated with the dispersion element 120 as discussed in relation to FIG. 3.

The dispersion element 120 separates the collimated light 116 into a plurality of light beams such as light beams 121-123. While shown as three light beams in FIG. 1 for ease of illustration, the collimated light 116 may be separated into many light beams, where each light beam includes light with a respective wavelength or band of wavelengths i.e., wavelength bands. For example, the light beam 121 may include light with a wavelength of 1271 nm or a band of light where the wavelength of the band of light ranges from 1264.5 nm to 1277.5 nm, among other examples.

The various wavelengths of the light beams 121-123 are directed to respective sections of the optical grating 130, including sections 131-133. The sections correspond to an incidence angle between the light beams 121-123 and a top surface 130a of the optical grating 130 that provides peak coupling efficiency for the wavelength of the respective light beam. For example, the light beam 121 is directed from the dispersion element 120 to the section 131, such that the light beam 121 interacts with the optical grating 130 at a first incidence angle ($\theta_1$) 141. The light beam 122 interacts with the section 132 at a second incidence angle ($\theta_2$) 142. The light beam 123 interacts with the section 133 at a third incidence angle ($\theta_3$) 143. The various pairings of the light beams and incidence angles provides for greater power coupling of the light beams to the waveguide 155 via the optical grating 130. Incidence angles which provide peak or optimal coupling efficiency are discussed in more detail in relation to FIG. 1C and FIG. 4.

In some examples, the dispersion element 120 is a reflective diffractive grating (e.g., a near-infrared blazed reflective grating) which separates the collimated light 116 into the light beams 121-123 and directs/reflects the separated or diffracted light beams 121-123 towards the optical grating 130 as shown in FIG. 1A.

In some examples, the components of the optical free space wavelength separator 110 are positioned/disposed on and supported by various mechanical packaging structures as shown in FIG. 1B, which illustrates a packaging configuration of fiber to photonic chip coupling system with a dispersive element. For example, the collimating lens 115 is disposed between the structure 161 and the structure 163. The dispersion element 120 is disposed on the structure 163 and the structure 162. The photonic chip 150 may also be associated with a cladding 151 disposed on and around the grating 130, as shown in in FIG. 1B.

Furthermore, the position of dispersion element 120 within the optical free space wavelength separator 110 is at an angle 170 with respect to the optical grating 130. In some examples, The position of the dispersion element 120 can also be adjusted to alter the angle 170 and an angle 175 and in turn the incidence angles 141-143 described in FIG. 1A to provide a peak coupling efficiency for the light.

In some examples, the peak coupling efficiency between the light beams 121-123 and the optical grating 130 depends on and can be determined using the wavelength of the individual light beams 121-123 shown in FIG. 1A, the incidence angle to the top surface 130a, the properties of the optical grating 130, and the dispersion element 120. FIG. 1C illustrates a light coupling mechanism of photonic grating coupler in a fiber to photonic chip coupling system, such as the system 100. For grating couplers, such as the grating 130, the wavevector of the incident light (e.g., a light beam 125) needs to meet certain conditions in relation to the wavevector of the light coupled in the grating 130, i.e. coupled light 135, as well as the wavevector of grating 130 itself as described in Equations 1-5 below.

A horizontal component of the wave vector ($ki_{125}$) of the incident light is a function of the wave vector equation, the incidence angle ($\theta_{145}$) between the light beam 125 and the grating 130, and an index of any cladding, such as cladding 151 above the grating 130 ($nc_{151}$), and the wavelength of the incident light ($\lambda_{125}$) as shown in Equation 1 below. In some examples, the cladding 151 is an oxide cladding deposited on the grating 130 between the dispersion element 120 and the grating 130.

A wave vector of the grating 130 ($K_{130}$) is a function of the period of the grating coupler ($\Lambda_{130}$) as shown in Equation 2. The wave vector ($kcoupled_{131}$) of the incident light once coupled to the grating 130, i.e. coupled light 135, is a function of $\lambda_{125}$ and an effective index of the grating 130 ($neff_{130}$). In order to conserve the momentum in horizontal direction, $kcoupled_{131}$ is equal to the summation of $ki_{125}$ and $K_{130}$ as shown in Equation 4. The various values from equations 1-3 can be used to solve for an optimum $\theta_{145}$ to provide peak coupling efficiency for the incidence light at a certain wavelength as shown in Equation 5 and discussed in more detail in relation to FIG. 4.

$$ki_{125}=(2\pi/\lambda_{125})*nc_{151}*\sin \theta_{145} \quad \text{Equation (1):}$$

$$K_{130}=2\pi/\Lambda_{130} \quad \text{Equation (2):}$$

$$kcoupled_{135}=2\pi/\lambda_{125}*neff_{130} \quad \text{Equation (3):}$$

$$ki_{125}+K_{130}=kcoupled_{135} \quad \text{Equation (4):}$$

$$2\pi/\lambda_{125}*nc_{151}*\sin \theta_{145}+2\pi/\Lambda_{130}=2\pi/\lambda*neff_{130} \quad \text{Equation (5):}$$

Figure 2:
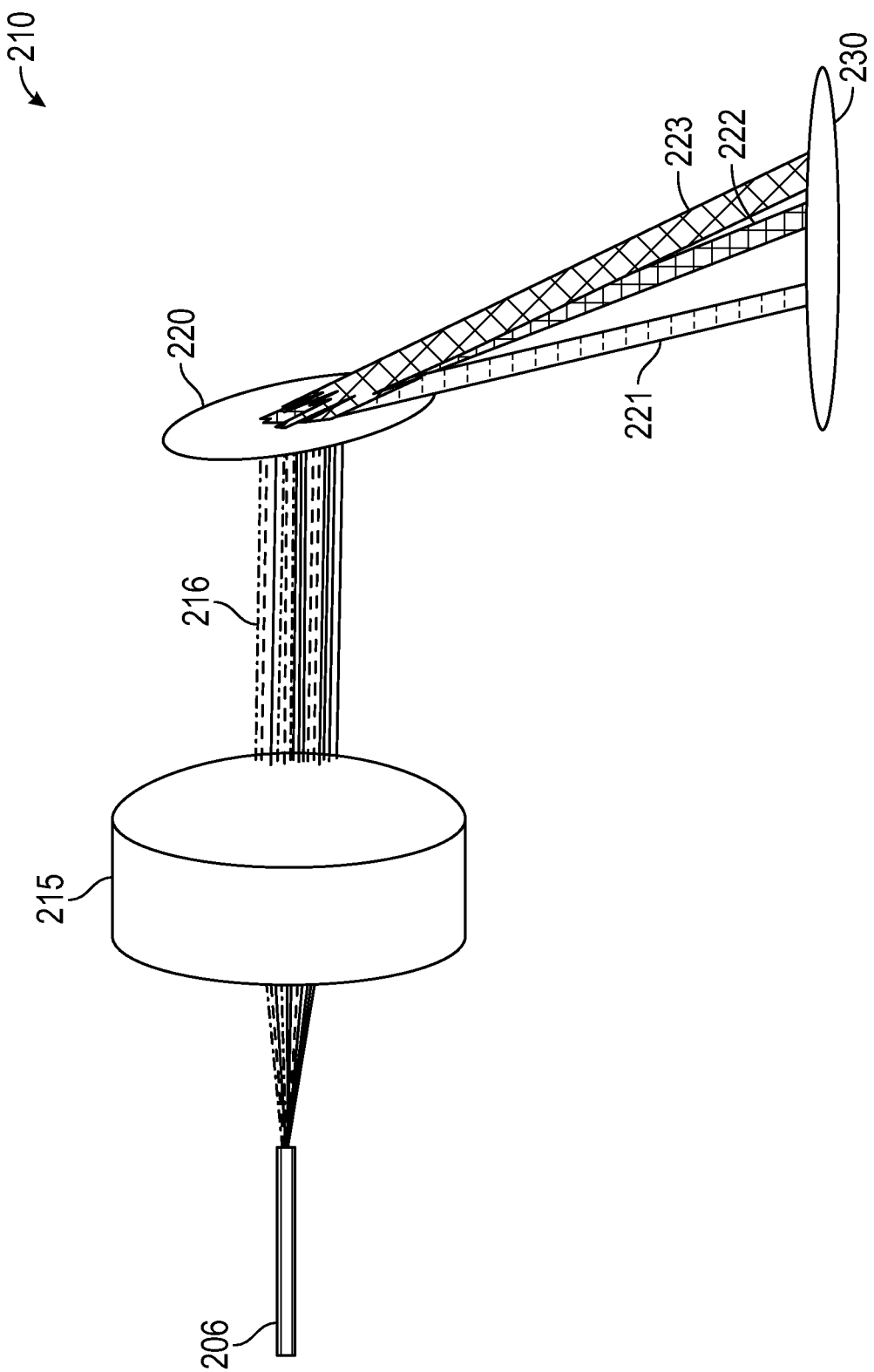
FIG. 2 illustrates an optical free space wavelength separator with transmissive gratings as a dispersive element, according to one embodiment.

FIG. 2 illustrates an optical free space wavelength separator using transmissive gratings as a dispersive element such as an optical free space wavelength separator 210, according to one embodiment. The optical free space wavelength separator 210 may be used in place of the optical free space wavelength separator 110 in the system 100 described in FIG. 1A. The optical free space wavelength separator 210 includes a collimating lens 215 and a transmissive dispersion element 220. The collimating lens 215 receives an un-collimated light 206 from an optical source, such as light source 105, and outputs the collimated light 216. The collimated light 216 is directed to the transmissive dispersion element 220. In some examples, the collimating lens 215 is a component of or integrated with the light source 105. For example, the light source 105 is a fiber optic cable with a lens attached to an end or terminus of the fiber. The collimating lens 215 may also be collocated with the dispersion element 220 as discussed in relation to FIG. 3.

The transmissive dispersion element 220 separates the collimated light 216 into a plurality of light beams such as light beams 221, 222, 223. While shown as three light beams in FIG. 2 for ease of illustration, the collimated light 216 may be separated into many light beams, where each light beam includes light with a respective wavelength or band of wavelengths. For example, the light beam 221 may include light with a wavelength of 1271 nm or a band of light where the wavelength of the band of light ranges from 1264.5 nm to 1277.5 nm, among other examples.

The various wavelengths of the light beams 221, 222, 223 are directed to sections of the optical grating 230 in a manner similar to sections 131-132 of the grating 130 in FIG. 1A. The sections correspond to an incidence angle between the light beams 221, 222, 223 and a top surface of the optical grating 230 that provides peak coupling efficiency for the wavelength of the respective light beam.

Figure 3:
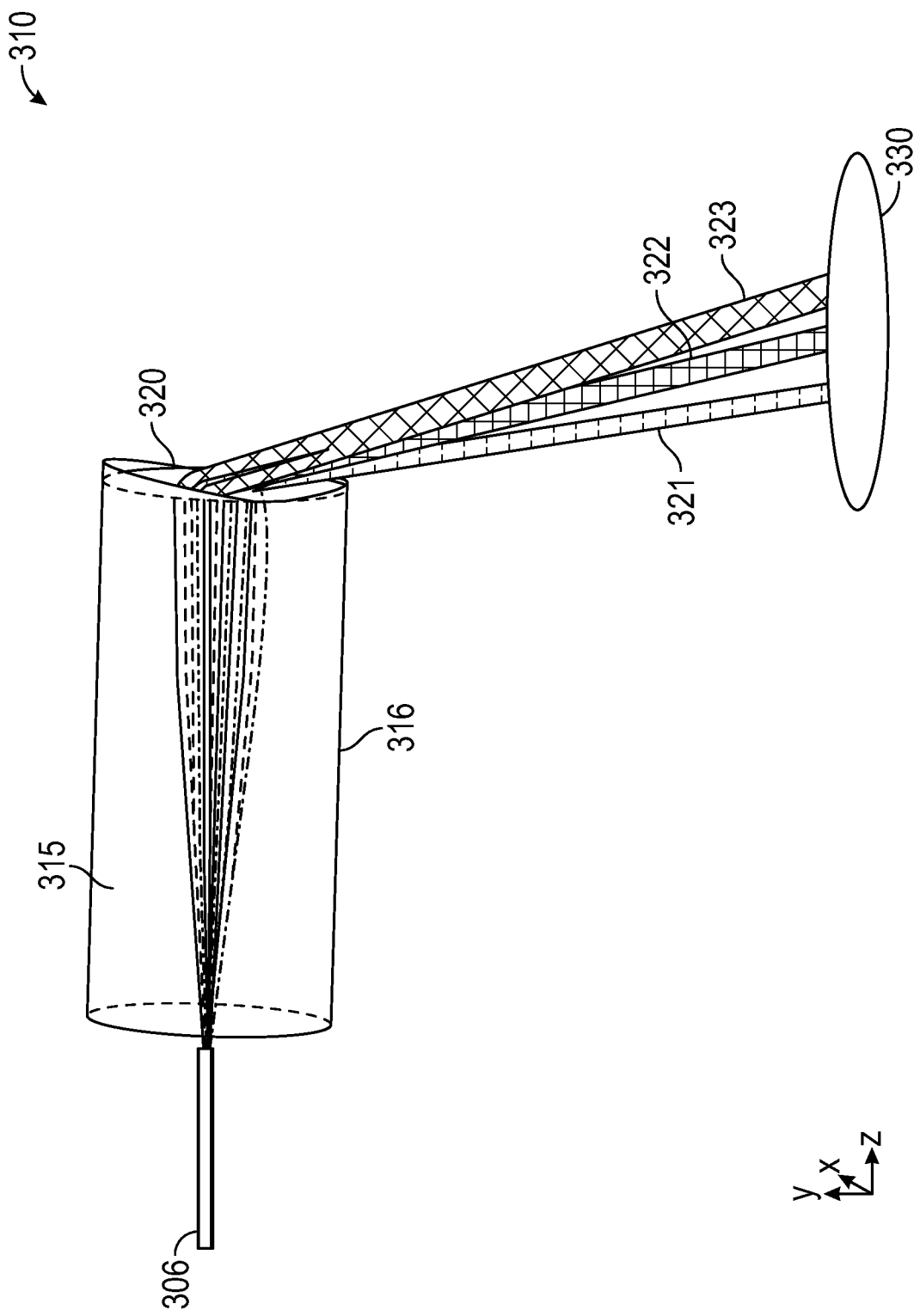
FIG. 3 illustrates an optical free space wavelength separator with an optical Gradient-index lens with integrated transmissive gratings as a dispersive element, according to one embodiment.

FIG. 3 illustrates an optical free space wavelength separator using optical GRIN (Gradient-index) lens integrated with transmissive gratings as an optical free space wavelength separator 310, according to one embodiment. The optical free space wavelength separator 310 may be used in place of the optical free space wavelength separator 110 in the system 100, as describe in FIG. 1A. The optical free space wavelength separator 310 includes gradient-index (GRIN) lens 315 and a transmissive diffractive grating 320 formed on a polished end-face of the GRIN lens 315. The GRIN lens 315 receives an un-collimated light 306 from an optical source, such as light source 105, and collimates the light into the collimated light 316. The collimated light 316 is directed to the transmissive diffractive grating 320.

The transmissive diffractive grating 320 separates the collimated light 316 into a plurality of light beams such as light beams 321, 322, 323. While shown as three light beams in FIG. 3 for ease of illustration, the collimated light 316 may be separated into many light beams, where each light beam includes light with a respective wavelength or band of wavelengths.

The various wavelengths of the light beams 321, 322, 323 are directed to sections of the optical grating 330 in a manner similar to sections 131-132 of the grating 130 in FIG. 1A. The sections correspond to an incidence angle between the light beams 321, 322, 323 and a top surface of the optical grating 330 that provides peak coupling efficiency for the wavelength of the respective light beam.

Figure 4:
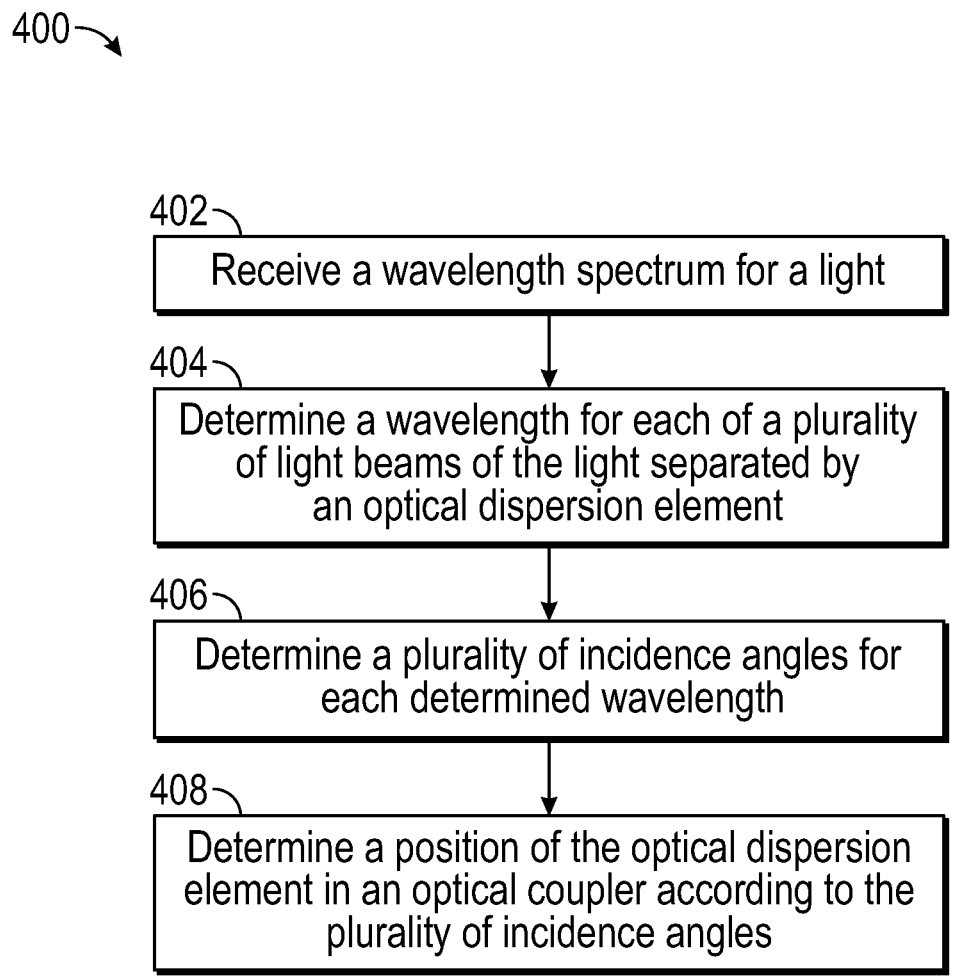
FIG. 4 illustrates a method to assemble a fiber to photonic chip coupling system with a dispersive element, according to embodiments described herein.

FIG. 4 illustrates a method to assemble a fiber to photonic chip coupling system with a dispersive element, according to embodiments described herein. Method 400 begins at block 402 where a fiber to photonic chip optical coupler module, such as optical coupler module 520 discussed in relation to FIG. 5, receives a wavelength spectrum for a light from an optical source. In some examples, the information is received from a user or system for a specific light source output from an optical fiber (e.g., a light source with a spectrum of 1260-1340 nm). For example, the system 500 receives information regarding the wavelength spectrum for a light such as the un-collimated light 106, 206, and 306 discussed in relation to FIGS. 1A, 2, and 3. For example, the system 500 receives data indicating the wavelength spectrum for the un-collimated light 106 is 1260-1340 nm.

At block 404, the optical coupler module 520 determines a wavelength for each of a plurality of light beams of the light separated by an optical dispersion element. For example, given grating coupler properties for a specific optical dispersion element such as the dispersion element 120, transmissive dispersion element 220, and/or the transmissive diffractive grating 320 the optical coupler module 520 determines how many light beams and the wavelength of the light beams that will be produced by the optical dispersion element. For example, as shown in FIG. 1A the dispersion element 120 produces 3 light beams 121-123.

At block 406, the optical coupler module 520 determines a plurality of incidence angles for each determined wavelength or wavelength band based on grating coupler properties. For example, given a wavelength for a light beam of the plurality of light beams, the optical coupler module 520 uses the equations 1-5 discussed in relation to FIG. 1C and given grating coupler properties to determine an optimal incidence angle for the wavelength of each light beam including factoring in any additional information for the optical coupler. For example, a light beam with a wavelength of 1280 nm will have an optimal incidence angle such as $\theta_{145}$ at 21.9 degrees based on a grating coupler design.

In some examples, the optical dispersion element is designed to separate the light beam into a plurality of different wavelengths with corresponding angles to interact with the optical grating. For example, the optical dispersion element is designed such that the diffraction angles for each determined wavelength from the dispersion element are equal to the incidence angles for each determined wavelength to the optical grating.

Once the designed angles and wavelengths are known a position of the dispersive element can be determined to ensure the light beams interact with the optical grating at optimum incidence angles.

In some examples, as discussed in relation to FIGS. 1B, 2, and 3, the optical dispersion element includes a reflective diffractive grating or a transmissive diffractive grating. The positioning of the optical dispersion element depends on the type of the grating. For example, when as shown in FIG. 1B, the optical coupler module 520 determines a position of the dispersion element 120 in the structures 162 and 163 in order to provide the determined incidence angles for the wavelengths of the light beams. For example, the module 520 determines the angle 170 such that when the dispersion element 120 is fixed in place and the collimated light 116 interacts with the dispersion element 120, the light beams 121-123 interact with the grating 130 according to the determined incidence angles determined in block 406. In another example, such as the transmissive dispersion element 220 and/or the GRIN lens 315, the position of the transmissive dispersion element 220 and the transmissive diffractive grating 320 on the GRIN lens 315 is determined in order to provide their respective light beams the determined incidence angles to the optical gratings 230 and 330 respectively.

At block 408, the optical coupler module 520 positions the optical dispersion element in the optical system according to the determined position. For example, the optical coupler module 520 using the alignment system 540 and attachment system 545 positions and verifies that the optical dispersion element is positioned with the assembly to ensure the light beams interact with the optical grating at optimum incidence angles.

Figure 5:
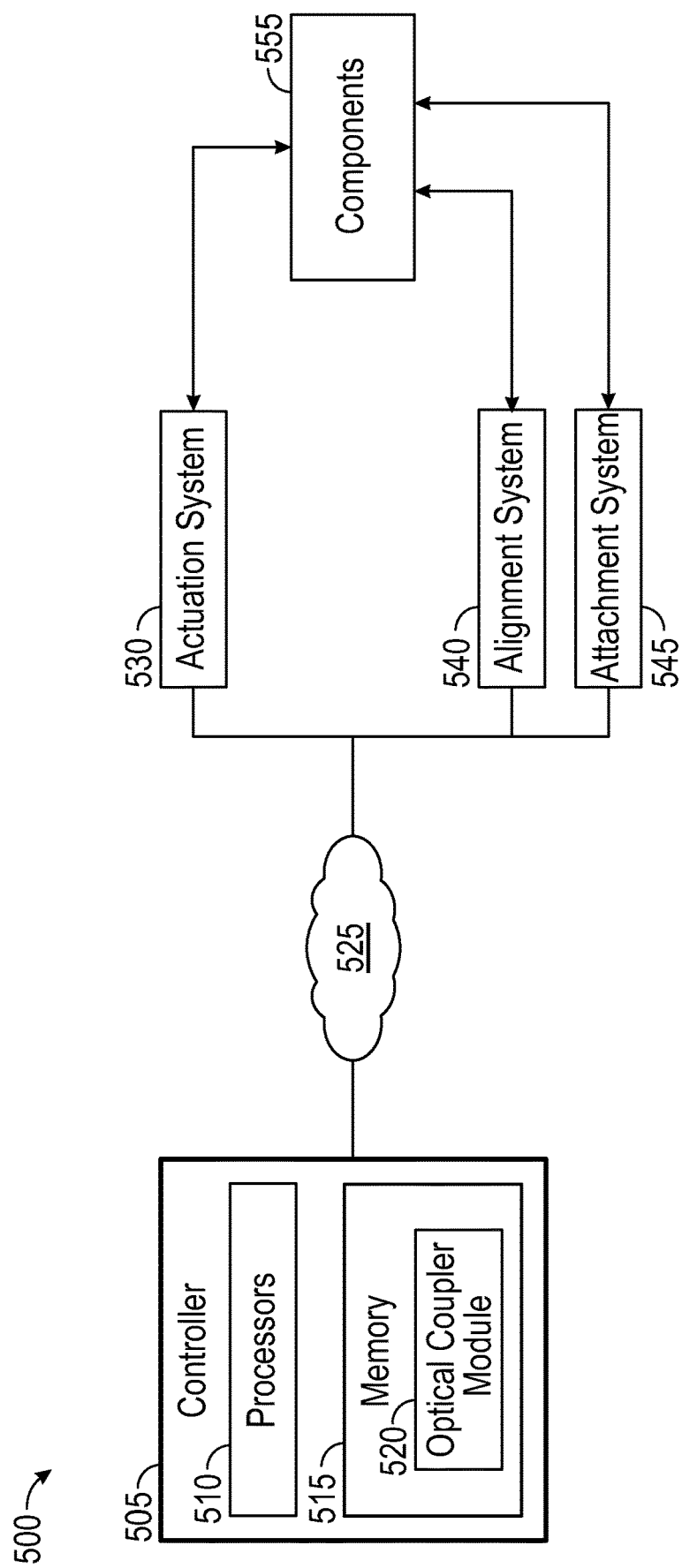
FIG. 5 is a block diagram of a system for assembling a fiber to photonic chip coupling system with a dispersive element, according to one or more embodiments.

FIG. 5 is a block diagram of a system 500 for constructing an optical apparatus including an optical coupler module as described herein, according to one or more embodiments. Features of the system 500 may be used in conjunction with other embodiments, such as the various optical coupling system, fiber optic communication systems, and dispersion elements, which are discussed above in relation to FIGS. 1A-4.

The system 500 comprises a controller 505 comprising one or more computer processors 510 and a memory 515. The one or more computer processors 510 represent any number of processing elements that each can include any number of processing cores. Some non-limiting examples of the one or more computer processors 510 include a microprocessor, a digital signal processor (DSP), an application-specific integrated chip (ASIC), and a field programmable gate array (FPGA), or combinations thereof. The memory 515 may comprise volatile memory elements (such as random access memory), non-volatile memory elements (such as solid-state, magnetic, optical, or Flash-based storage), and combinations thereof. Moreover, the memory 515 may be distributed across different mediums (e.g., network storage or external hard drives).

The memory 515 may comprise a plurality of "modules" for performing various functions described herein. In one embodiment, each module includes program code that is executable by one or more of the computer processors 510. However, other embodiments may include modules that are partially or fully implemented in hardware (i.e., circuitry) or firmware of the controller 505. As shown, the memory 515 comprises an optical coupler module 520 configured to control various stages of manufacturing (or assembling) an optical coupling system as described in relation to FIGS. 1A-4. The optical coupler module 520 is configured to communicate control signals to one or more systems via a network 525. The network 525 may include one or more networks of various types, including a personal area network (PAN), a local area or local access network (LAN), a general wide area network (WAN), and/or a public network (e.g., the Internet).

As shown, the system 500 comprises an actuation system 530, an alignment system 540, and an attachment system 545, each of which is communicatively coupled with the controller 505 via the network 525. Based on control signals received from the controller 505, one or more of these systems may be configured to manipulate one or more components 555, such as semiconductor substrates (e.g., photonic chip 150) and/or optical components (the dispersion element 120, and related components such as the collimating lenses) when constructing the optical apparatus.

In some embodiments, the actuation system 530 is configured to alter an orientation of the components 555 (e.g., translation and/or rotation) between different stages of processing, maintain an orientation of the components 555 during the processing, and so forth. For example, the actuation system 530 may comprise one or more robotic arms and/or gripping systems.

As part of constructing the optical apparatus, a plurality of optical fibers, and/or other optical and/or electronic components may be placed on the components 555. In some embodiments, the alignment system 540 is configured to perform an optical alignment of the collating lens, the dispersion elements and the optical gratings. For example, the alignment system 540 may comprise an active alignment system configured to provide optical signals to the optical fibers and/or lenses to generate an optical signal.

In some embodiments, the alignment system 540 is used to optically align the plurality of optical fibers and the optical coupling system after attachment to the components 555. For example, the alignment system 540 may manipulate the components 555 to align the dispersion element and gratings and the plurality of optical fibers with respective waveguides formed in a photonic substrate. In other embodiments, the alignment system 540 may operate in conjunction with the actuation system 530 to manipulate the components 555 and/or the semiconductor substrate.

In some embodiments, the attachment system 545 is configured to attach the components 555 with one or more of: other substrates, components 555, the optical coupling system, the plurality of optical fibers, and other optical and/or electronic components according to any suitable techniques. In some embodiments, the attachment system 545 may be used in multiple attachment stages. For example, the attachment system 545 may be configured to apply an epoxy between the optical fibers, the structures 161-162, and a first one of the components 555, to apply an epoxy between the first one and a second one of the components 555, to apply an epoxy between the first one of the components 555 and a semiconductor substrate, and so forth. The attachment system 545 may further be configured to cure the epoxy, e.g., by applying an ultraviolet (UV) light.

The controller 505 may be implemented in any suitable form. In some embodiments, the controller 505 comprises a singular computing device providing centralized control of the construction process. In other embodiments, the controller 505 represents multiple, communicatively coupled computing devices, which may or may not have centralized control. For example, some or all of the actuation system 530, the alignment system 540, and the attachment system 545 may comprise local controllers that are in communication with the controller 505 via the network 525. In an alternate embodiment, the operation of the actuation system 530, the alignment system 540, and the attachment system 545 may be achieved independently of centralized control.

Further, while the system 500 is described primarily in terms of manipulating the components 555, the various systems described herein may interact with other components as part of constructing the optical coupling system. For example, the actuation system 530 may be configured to manipulate the plurality of optical fibers, and other electrical and/or optical components.

To further improve optical coupling, vision-assisted alignment or active alignment may be performed in a limited number of axes. Since interlocking the alignment features or other features of the substrate is effective to provide at least a coarse alignment of the optical fibers with the waveguides of the substrate, the vision-assisted alignment or the active alignment may be used to provide a finer alignment while adding minimal process time. Use of these simple and inexpensive mechanical features to "pre-align" the optical coupling system to the photonic chip can reduce or eliminate the cost of automation (e.g., precision placement and peak searching algorithms), ultimately reducing the overall cost of alignment.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

We claim:

1. A fiber to photonic chip coupling system comprising:
    a gradient-index (GRIN) collimating lens configured to collimate a light transmitted from a light source to produce a collimated light;
    an optical grating comprising a plurality of grating sections; and
    an optical dispersion element configured to separate the collimated light from the collimating lens into a plurality of light beams and direct each of the plurality of light beams to a respective section of the plurality of grating sections, wherein the optical dispersion element is formed on a polished end-face of the GRIN collimating lens,
    wherein each light beam in the plurality of light beams is diffracted from the optical dispersion element at a different wavelength, and wherein a light beam of the plurality of light beams is directed to a respective section of the plurality of grating sections at a respective incidence angle based on the wavelength of the light beam of the plurality of light beams.

2. The fiber to photonic chip coupling system of claim 1 wherein the optical dispersion element comprises:
    a diffractive grating configured to separate the collimated light into a plurality of beams by diffracting the collimated light at a plurality of diffraction angles based on a wavelength of various rays of light in the collimated light,
    wherein the plurality of diffraction angles from the diffractive grating directs the diffracted light beams of the plurality of light beams to respective sections of the plurality of grating sections.

3. The fiber to photonic chip coupling system of claim 2, wherein the diffractive grating comprises a transmissive diffractive grating.

4. The fiber to photonic chip coupling system of claim 3, wherein the transmissive diffractive grating is formed on the polished end-face of the GRIN collimating lens.

5. The fiber to photonic chip coupling system of claim 1, wherein a first beam of the plurality of light beams comprises a first wavelength,
    wherein the first beam is directed to a first section of the plurality of grating sections to interact with the first section at a first incidence angle, and
    wherein the first incidence angle provides a first peak coupling efficiency for the first wavelength.

6. The fiber to photonic chip coupling system of claim 5, wherein a second beam of the plurality of light beams comprises a second wavelength,
    wherein the second beam is directed to a second section of the plurality of grating sections to interact with the second section at a second incidence angle, and
    wherein the second incidence angle provides a second peak coupling efficiency for the second wavelength.

7. The fiber to photonic chip coupling system of claim 1, wherein the light source comprises an optical source connected with an optical fiber transmitting an un-collimated light.

8. The fiber to photonic chip coupling system of claim 1, wherein the coupling system is a component of a fiber optic communication system, wherein the fiber optic communication system further comprises:
  an optical fiber transmitting an un-collimated light to the coupling system; and
  a photonic chip comprising the optical grating.

* * * * *